(12) United States Patent
Futami et al.

(10) Patent No.: US 8,026,972 B2
(45) Date of Patent: Sep. 27, 2011

(54) PICTURE-TAKING LENS UNIT

(75) Inventors: Akira Futami, Higashikurume (JP); Koji Kato, Tama (JP); Takashi Okamura, Hachioji (JP)

(73) Assignee: Olympus Corporation, Tokyo (JP)

( * ) Notice: Subject to any disclaimer, the term of this patent is extended or adjusted under 35 U.S.C. 154(b) by 658 days.

(21) Appl. No.: 12/119,688

(22) Filed: May 13, 2008

(65) Prior Publication Data

US 2008/0218625 A1 Sep. 11, 2008

Related U.S. Application Data

(62) Division of application No. 10/292,915, filed on Nov. 12, 2002, now Pat. No. 7,391,460.

(30) Foreign Application Priority Data

| Nov. 13, 2001 | (JP) | 2001-347817 |
| Nov. 21, 2001 | (JP) | 2001-356365 |
| Nov. 21, 2001 | (JP) | 2001-356366 |
| Nov. 21, 2001 | (JP) | 2001-356367 |
| Nov. 21, 2001 | (JP) | 2001-356368 |
| Nov. 21, 2001 | (JP) | 2001-356369 |

(51) Int. Cl.
*G03B 13/00* (2006.01)
*H04N 5/225* (2006.01)
(52) U.S. Cl. ...................... 348/345; 348/335
(58) Field of Classification Search .................. 348/345, 348/376, 344, 333.09, 335, 372–374
See application file for complete search history.

(56) References Cited

U.S. PATENT DOCUMENTS

| 5,463,438 A * | 10/1995 | Kosako ........................ 396/377 |
| 6,157,781 A * | 12/2000 | Konno et al. .................... 396/71 |
| 6,930,719 B2 * | 8/2005 | Nakagishi et al. ............. 348/335 |

FOREIGN PATENT DOCUMENTS

| JP | 7-199296 | 8/1995 |
| JP | 10-213839 | 8/1998 |
| JP | 11-095287 | 4/1999 |
| JP | 2000-147606 | 5/2000 |
| JP | 2001-215569 | 8/2001 |
| JP | 2002-99033 | 4/2002 |

OTHER PUBLICATIONS

Notification of Reasons For Rejection for Japanese Patent Application No. 2002-337579, mailed Oct. 21, 2008 (5 pgs.) with translation (7 pgs.).
Notification of Reasons for Rejection to Japanese Patent Application No. 2002-337578, mailed Sep. 24, 2008 (3 pgs.) with translation (3 pgs.).
Notice of Reasons for Rejection to Japanese Patent Application No. 2002-337579, mailed May 27, 2008 (5 pgs.) with translation (9 pgs.).
Notice of Reasons for Rejection to Japanese Patent Application No. 2002-337580, mailed May 27, 2008 (3 pgs.) with translation (5 pgs.).

* cited by examiner

*Primary Examiner* — David Ometz
*Assistant Examiner* — Ahmed Berhan
(74) *Attorney, Agent, or Firm* — Straub & Pokotylo; John C. Pokotylo

(57) ABSTRACT

A camera according to the present invention includes a picture-taking lens unit including a picture-taking optical system having a bending optical system which optically bends incident light and an optical finder unit including a finder optical system having a bending optical system which optically bends incident light. A pre-bending optical system and a post-bending optical system in the bending optical system of the optical finder unit are arranged adjacent to a pre-bending optical system and a post-bending optical system in the bending optical system of the picture-taking lens unit, respectively. The body of the camera is therefore decreased in size.

7 Claims, 9 Drawing Sheets

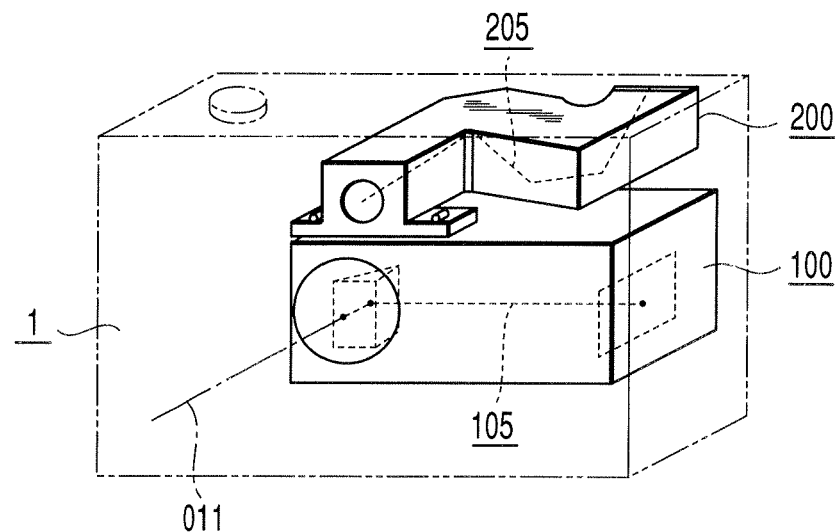
F I G. 1
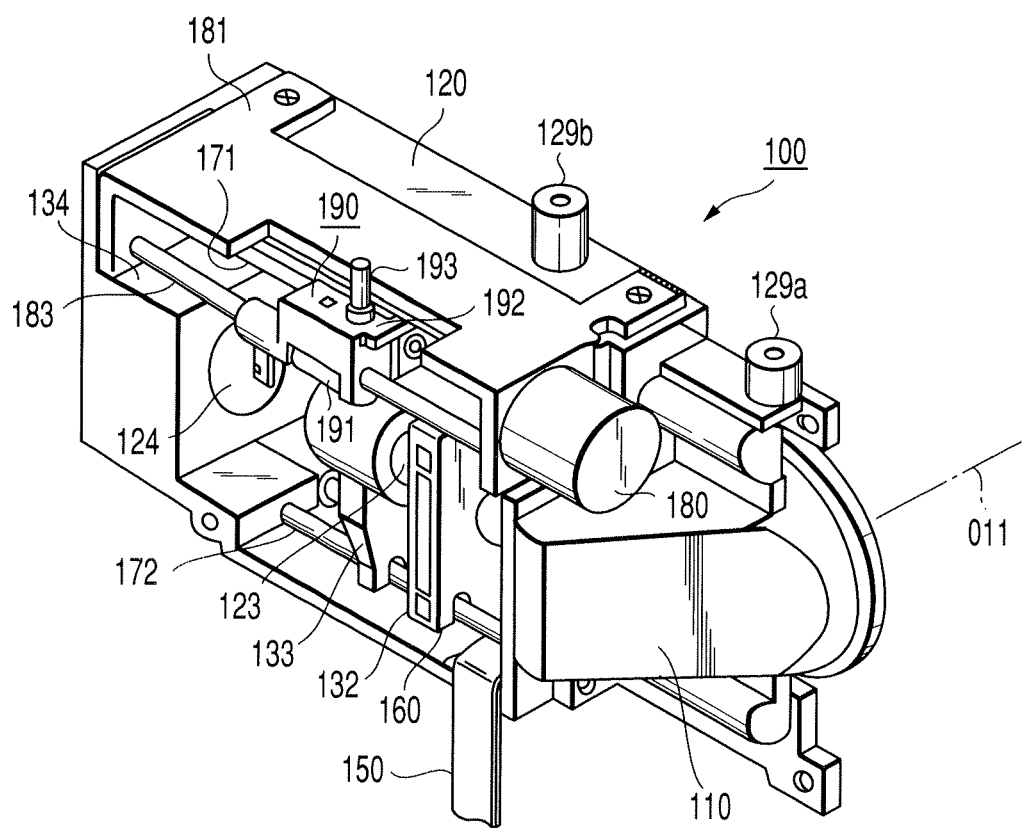
F I G. 2

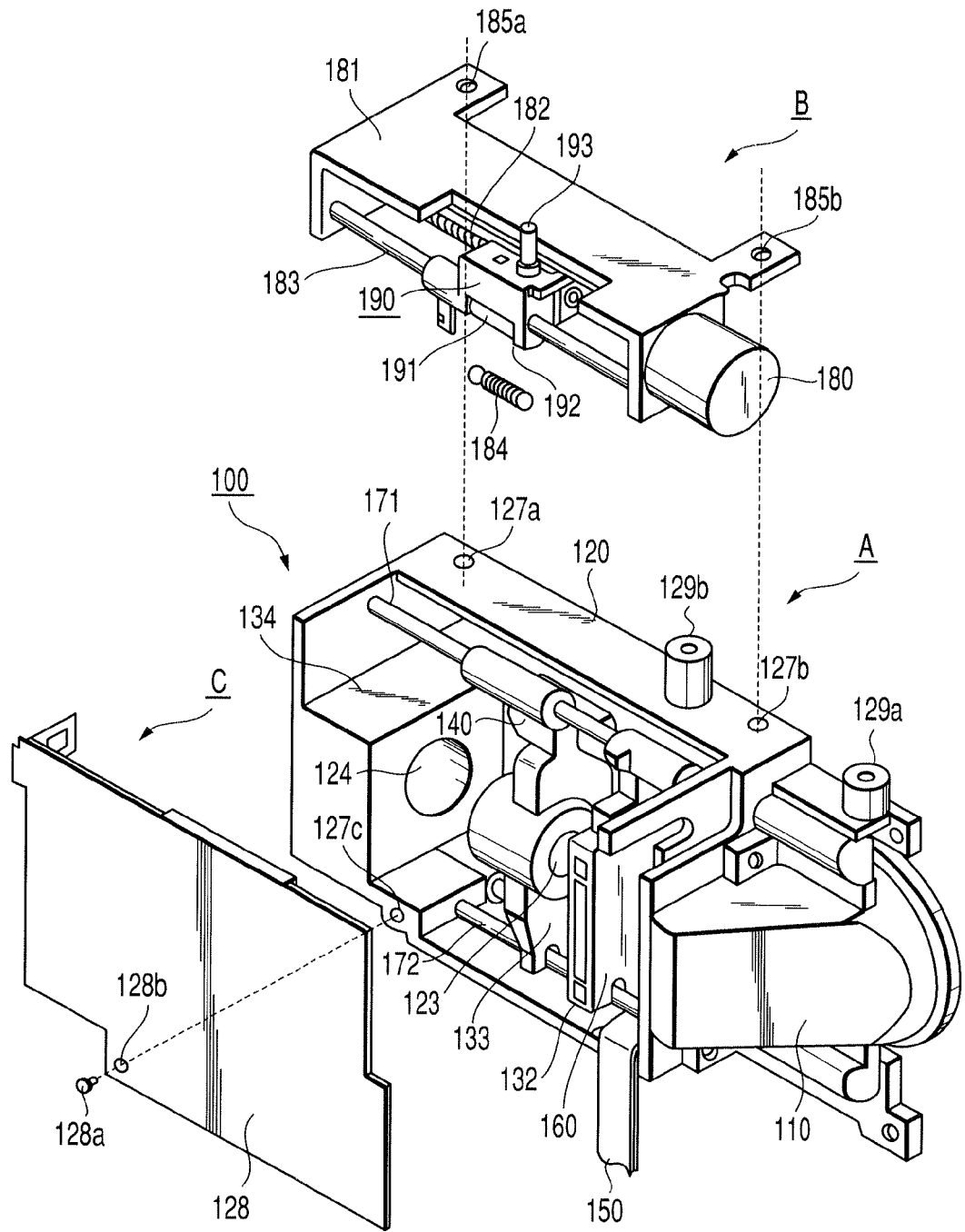
F I G. 3

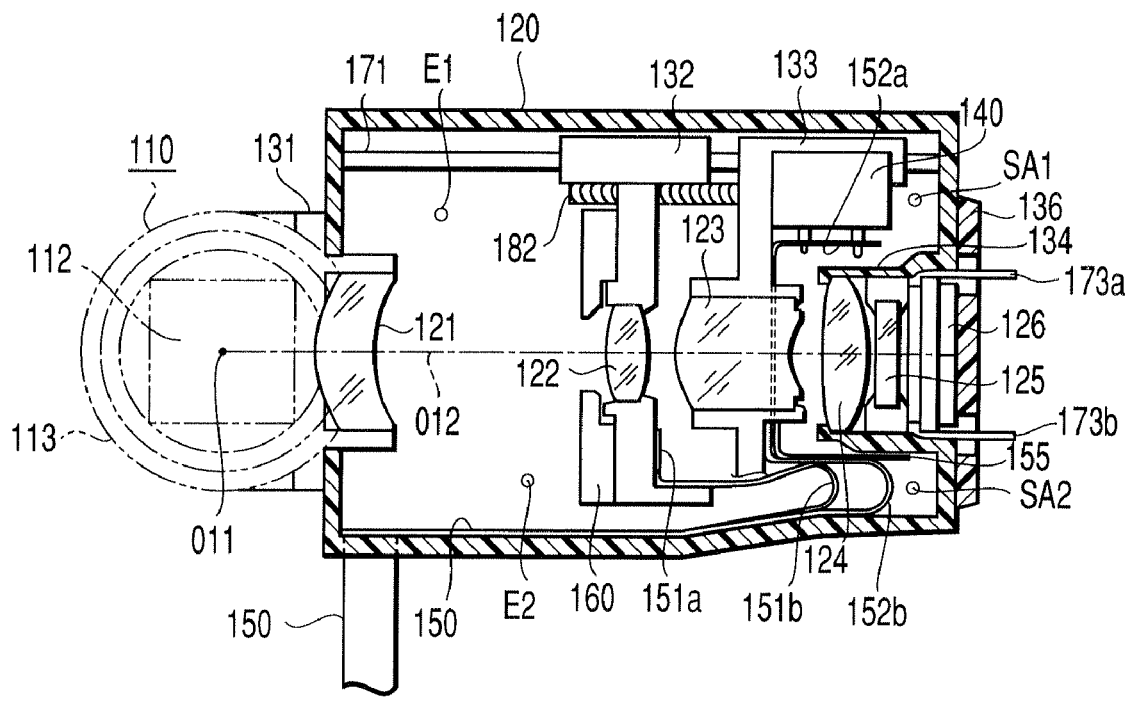
F I G. 4A
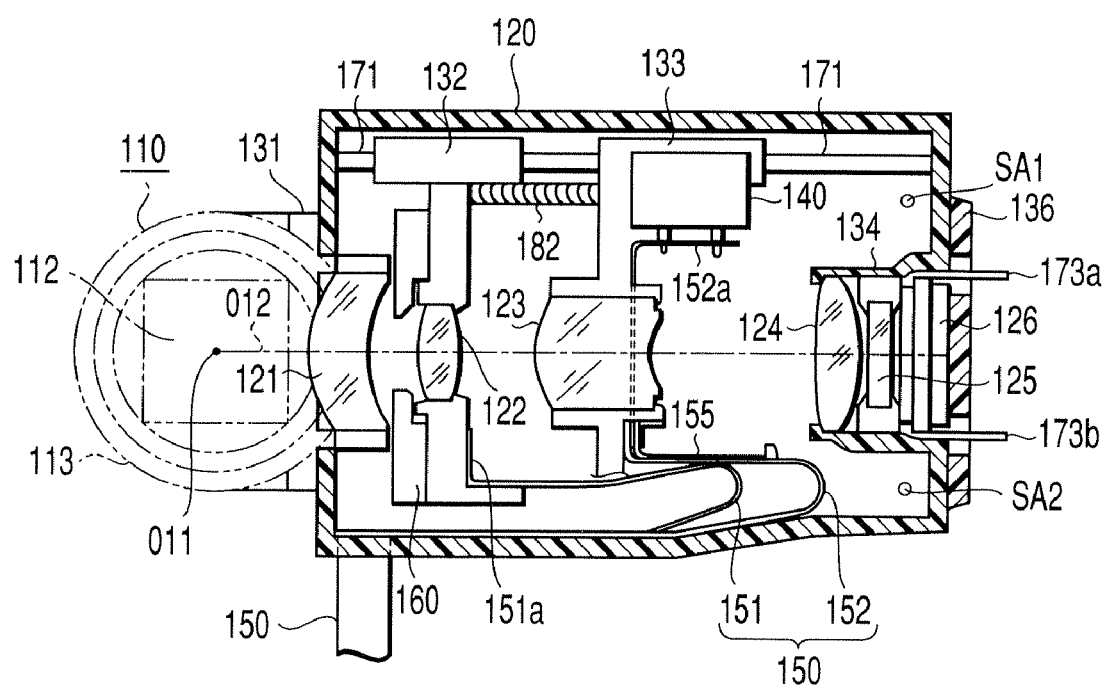
F I G. 4B

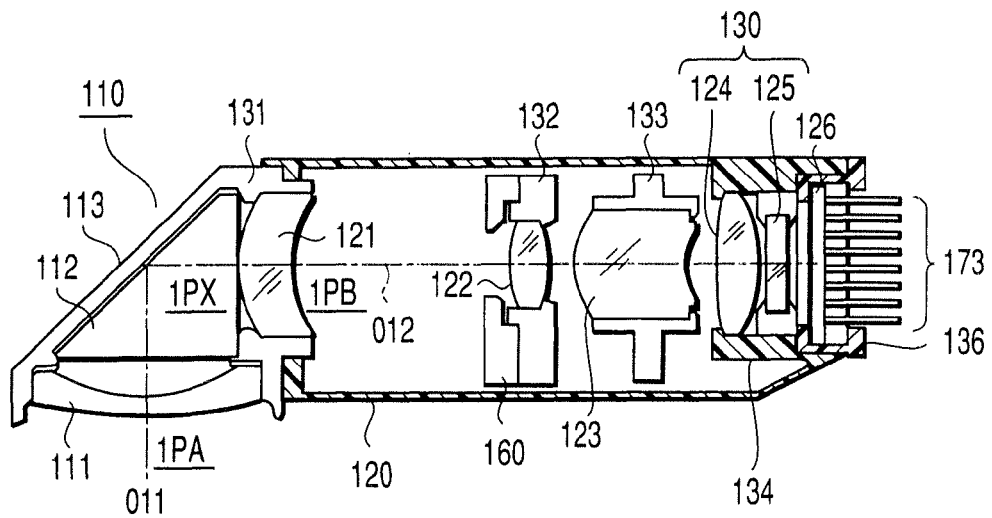
FIG. 5
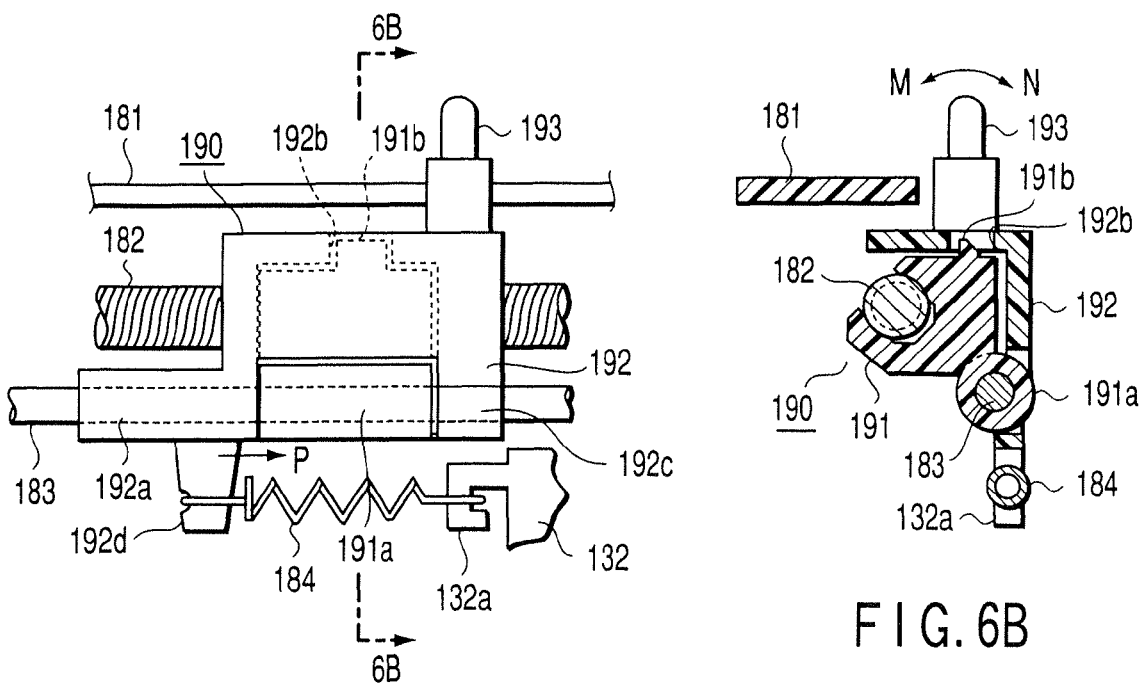
FIG. 6A
FIG. 6B

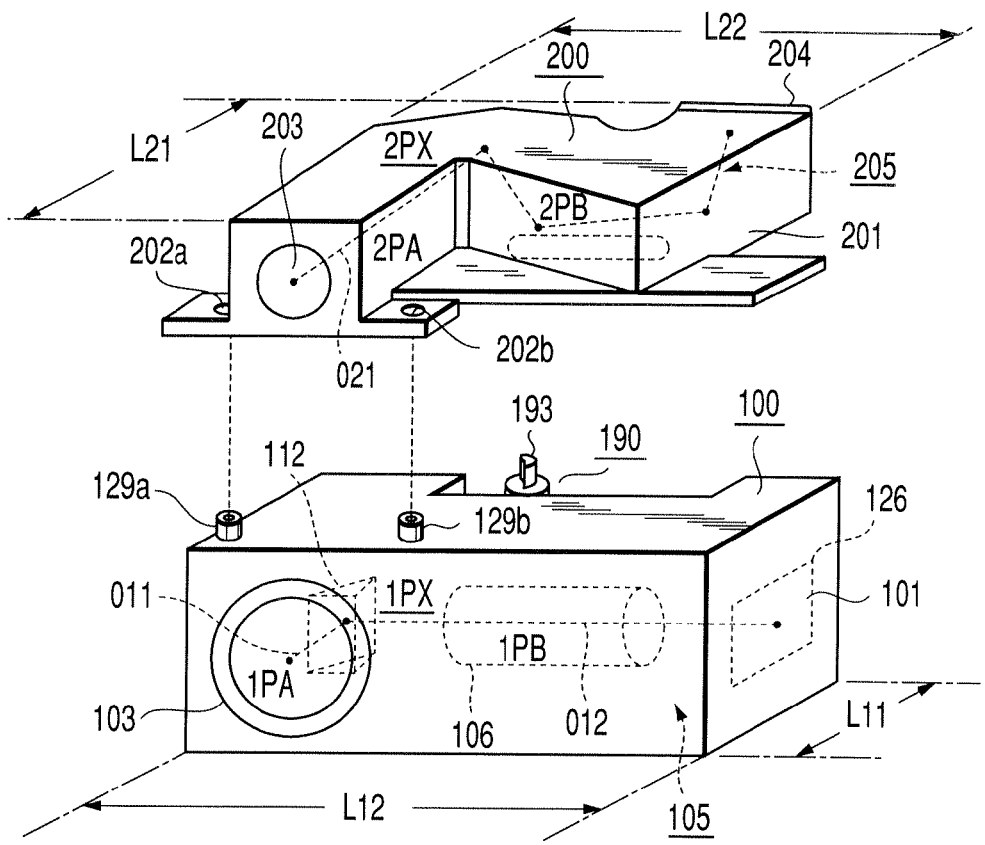
F I G. 7
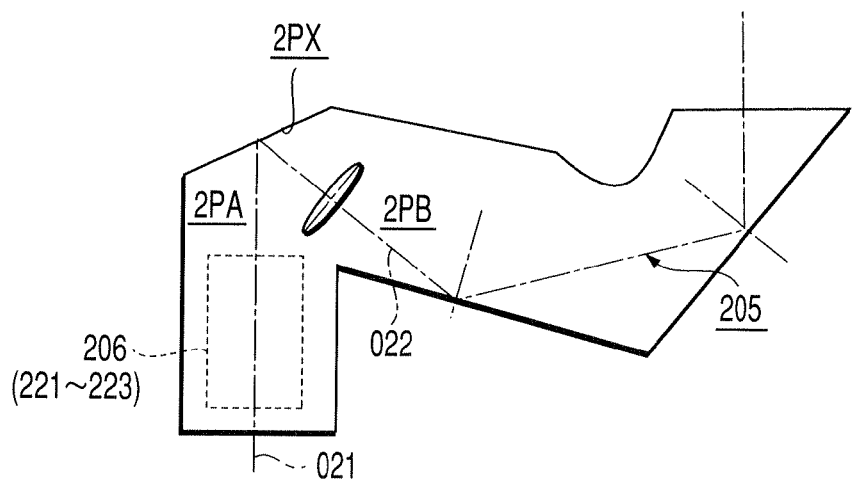
F I G. 8

PICTURE-TAKING LENS UNIT

CROSS-REFERENCE TO RELATED APPLICATIONS

This application is a divisional application of U.S. patent application Ser. No. 10/292,915, titled "ARRANGEMENT OF BENDING OPTICAL SYSTEMS IN A PICTURE TAKING LENS UNIT AND AN OPTICAL FINDER UNIT OF A CAMERA," (as amended) filed on Nov. 12, 2002 now U.S. Pat. No. 7,391,460, which is based upon and claims the benefit of priority from the prior Japanese Patent Applications No. 2001-347817, filed Nov. 13, 2001; No. 2001-356365, filed Nov. 21, 2001; No. 2001-356366, filed Nov. 21, 2001; No. 2001-356367, filed Nov. 21, 2001; No. 2001-356368, filed Nov. 21, 2001; and No. 2001-356369, filed Nov. 21, 2001. The entire contents of each of the foregoing applications are incorporated herein by reference.

BACKGROUND OF THE INVENTION

1. Field of the Invention

The present invention relates to a camera having a picture-taking optical system and an optical finder including a finder optical system favorable for the camera.

2. Description of the Related Art

It is generally desired that cameras, especially electronic cameras be thinned. To achieve a thin electronic camera, it has recently been proposed that the camera be equipped with a so-called optical-axis bending type picture-taking optical system. This type of picture-taking optical system is disclosed in Jpn. Pat. Appln. KOKAI Publication No. 11-196303. As is described in this publication, the picture-taking optical system includes a reflection plane, on which a picture-taking optical axis is bent and its direction made coincident with the width direction of the camera, thereby reducing thickness of the camera.

Cameras require a finder. The finder aims at observing an image of an object to be photographed and generally an optical finder is used as such a finder. Electronic cameras usually include an LCD (liquid crystal display) to allow the image of an object to be observed. In view of power savings, however, most electronic cameras are so configured that an optical finder is used for taking a picture of an object and an LCD is used only for reproducing the picture for observation.

Cameras also require a zoom mechanism. The zoom mechanism is designed to continuously vary focal length, usually by moving a zoom lens in the direction of an optical axis. If a picture-taking optical system is to include a zoom mechanism, its corresponding optical finder also needs a zoom mechanism. These zoom mechanisms have to be interlocked with each other. Jpn. Pat. Appln. KOKAI Publications Nos. 2000-147606 and 2001-133850 disclose a camera that is so configured that the zoom ratio of a finder optical system varies with that of a picture taking optical system.

To incorporate an optical-axis bending type picture-taking optical system allows a picture-taking lens unit to be thinned. However, such an optical-axis bending type picture-taking optical system is not housed in a camera body appropriately depending upon a combination with an optical finder. It is thus likely that the camera body will be difficult to thin and downsize.

In cameras with a zoom mechanism, the picture-taking lens unit having a picture-taking optical system and the optical finder unit having a finder optical system both increase in size. Furthermore, an interlocking mechanism for interlocking the zoom operations of both the units with high precision has to be provided in order to avoid a difference in zoom ratio between the image pickup optical system and the finder optical system.

As is evident from the above, there is fear that a camera including both a picture-taking lens unit having an optical-axis bending type optical system and a zoom lens and an optical finder unit having an optical axis bending type optical system and a zoom lens can be neither compacted nor thinned.

BRIEF SUMMARY OF THE INVENTION

The present invention has been developed in consideration of the above situation and its object is to provide a camera and an optical finder both having at least the following advantages.

Even though the picture-taking optical system includes a bending optical system and a zoom mechanism and the finder optical system includes a bending optical system and a zoom mechanism, the camera body can be thinned and compacted.

The camera and optical finder of the present invention are simple in configuration and easy to manufacture.

To attain the above object, the camera according to the present invention has the following characteristic configuration. Other characteristic configurations will be clarified in the Embodiment later.

A camera according to the present invention comprises a picture-taking lens unit including a picture-taking optical system having a bending optical system which optically bends incident light and an optical finder unit including a finder optical system having a bending optical system which optically bends incident light, wherein a pre-bending optical system and a post-bending optical system in the bending optical system of the optical finder unit are arranged adjacent to a pre-bending optical system and a post-bending optical system in the bending optical system of the picture-taking lens unit, respectively.

In the camera described above, both the picture-taking lens unit and the optical finder unit are assembled into one unit such that the pre-bending optical systems correspond to each other and the post-bending optical systems correspond to each other. Therefore, the body of the camera comprising the picture-taking lens unit including the bending optical system and the optical finder unit including the bending optical system can be made thin and compact properly.

A camera according to the present invention comprises a picture-taking lens unit including a picture-taking optical system having a bending optical system which optically bends incident light and an optical finder unit including a finder optical system having a bending optical system which optically bends incident light, wherein the picture-taking lens unit has such an outside shape that a length thereof in a direction parallel to an optical axis of the pre-bending optical system in the bending optical system is shorter than a length thereof in a direction perpendicular to the optical axis of the pre-bending optical system, the optical finder unit has such an outside shape that a length thereof in a direction parallel to an optical axis of the pre-bending optical system in the bending optical system and a length thereof in a direction perpendicular to the optical axis of the pre-bending optical system are approximated to the lengths in the picture-taking lens unit, respectively, and the picture-taking lens unit and the optical finder unit are arranged close to each other such that a pre-bending optical system and a post-bending optical system of the bending optical system in the finder optical system are arranged adjacent to a pre-bending optical system and a post-bending optical system of the bending optical system in the picture-taking optical system, respectively.

In the camera described above, the picture-taking lens unit and optical finder unit have similar shapes and dimensions and are arranged close to each other. The camera, which is equipped with an optical finder having bending optical systems, can be made compact.

A camera according to the present invention comprises a picture-taking lens unit including a picture-taking optical system having a bending optical system which optically bends incident light and a picture-taking zoom lens provided movably in a direction of an optical axis and an optical finder unit including a finder optical system having a bending optical system which optically bends incident light and an observation zoom lens provided movably in a direction of an optical axis, wherein a pre-bending optical system and a post-bending optical system in the bending optical system of the optical finder unit are arranged adjacent to a pre-bending optical system and a post-bending optical system in the bending optical system of the picture-taking lens unit, respectively.

In the camera described above, the pre-bending optical systems of the picture-taking lens unit and the pre-bending optical system of the optical finder unit are arranged adjacent to each other, as are the post-bending optical systems thereof. No wasted space is therefore difficult to create at the time of assembly of both the units, and the camera as a whole can be made thin and compact. This arrangement contributes to a downsizing of the camera including the bending optical systems and the zoom lenses.

A camera according to the present invention comprises a camera body, a first zoom lens moving mechanism which moves a picture-taking zoom lens of a picture-taking optical system in the camera body in the direction of the optical axis of the picture-taking optical system, a second zoom lens moving mechanism which moves an observation zoom lens of a finder optical system in the camera body in the direction of the optical axis in the finder optical system, and a finder driving mechanism which interlocks the first zoom lens moving mechanism with the second zoom lens moving mechanism so that the observation zoom lens moves in accordance with the movement of the picture-taking zoom lens of the picture-taking optical system, wherein the finder driving mechanism includes a driving-force transmitter movable in a specific direction other than the direction of the optical axis of the picture-taking optical system.

In the camera described above, even though there is a variation in mounting dimensions between the picture-taking optical system and finder optical system, a displacement in position due to this variation is absorbed by the movement of the driving-force transmitter in the specific direction. The driving-force transmitter (driving pin) can thus be reliably fitted to a given position of the finder optical system. Consequently, both the picture-taking optical system and the finder optical system can be properly assembled without strictly adjusting the relative position between these systems.

A camera according to the present invention comprises a picture-taking lens unit including a picture-taking optical system having a picture-taking zoom lens which is movable in the direction of the optical axis and an optical finder unit including a finder optical system having an observation zoom lens which is movable in the direction of an optical axis in association with the movement of the picture-taking zoom lens of the picture-taking lens unit, wherein the picture-taking lens unit further includes a driving-force transmitter (driving pin) which moves in the direction of the optical axis of the picture-taking optical system as the picture-taking zoom lens moves in the direction of the optical axis and which freely moves in a specific direction other than the direction of the optical axis of the picture taking optical system, and the optical finder unit further includes a guide section which restricts a movement of the driving-force transmitter in the specific direction in association with the driving-force transmitter (driving pin) and allows the driving-force transmitter to move in the direction of the optical axis of the picture-taking optical system, and a zoom lens moving mechanism which moves the observation zoom lens in accordance with the movement of the driving-force transmitter, which is restricted by the guide section, so as to make a zoom ratio of the optical finder unit equal to a given zoom ratio.

In the camera described above, even though there is a variation in mounting dimensions between the picture-taking optical system and finder optical system, a displacement in position due to variation is absorbed by the movement of the driving-force transmitter in the specific direction. The driving-force transmitter can be properly fitted to the guide section, which is correctly formed in advance at a given position of the optical finder unit. Consequently, both the picture-taking lens unit and the optical finder unit can be properly assembled without making any special adjustment to a relative position between these units. Further, the movement of the driving-force transmitter in the specific direction is restricted by the guide section very reliably. Consequently, a difference in zoom ratio between the picture-taking optical system and the finder optical system can be prevented from occurring, and an observation function of the optical finder due to the difference in zoom ratio can be prevented from deteriorating.

An optical finder according to the present invention comprises a finder optical system having a plurality of movable lenses including an observation zoom lens which is movable in the direction of the optical axis of the finder optical system, and a moving mechanism which moves the plurality of movable lenses of the finder optical system in association with the movement of a picture-taking zoom lens of a picture-taking optical system, wherein the moving mechanism includes a plurality of driving plates which are stacked one on another such that the driving plates are rotatable, cam sections provided on the plurality of driving plates, respectively and fitted to a driving-force transmitter which moves as the picture-taking zoom lens of the picture-taking optical system moves, the cam sections converting a movement of the driving-force transmitter into a rotating operation of each of the driving plates, and movement operating sections which are provided in the driving plates rotated by action of the cam sections to move the plurality of moving lenses in the finder optical system.

In the optical finder described above, the plurality of driving plates are stacked one on another. The area of the driving plates occupied in an optical finder unit can thus be decreased, as compared with the case where a plurality of cam sections are arranged on a single driving plate. Since, moreover, no gap is formed between the stacked driving plates, there is no fear that the camera will increase in volume (thickness) even though a number of driving plates are used. Consequently, the second zoom lens moving mechanism of the optical finder can be reduced in size.

A camera according to the present invention comprises a picture-taking lens unit including a picture-taking optical system having a bending optical system, which optically bends light incident along the optical axis, and a plurality of movable lenses including a picture-taking zoom lens provided in a post-bending optical system of the bending optical system, an optical finder unit including a finder optical system having a plurality of movable lenses, including an observation zoom lens, provided along an optical axis of incident light parallel to an optical axis of the picture-taking lens unit, and a lens moving conjunction which moves the plurality of movable lenses in association with the picture-taking zoom lens, wherein the lens moving mechanism includes a plurality of driving plates stacked one on another in the optical finder unit such that distal ends thereof are rotated with regard to proximal ends thereof, cam sections provided in the driving plates, respectively, and fitted to a driving-force transmitter (driving pin) which moves together with the picture-taking zoom lens of the picture-taking optical system, the cam sections converting a movement of the driving-force transmitter into a rotating operation of each of the driving plates, and moving operating sections provided at respective distal ends of the driving plates, which are rotated by action of the cam sections, the moving operating sections moving the movable lenses including the observation zoom lens of the finder optical system.

In the above-described camera, the picture-taking lens unit and the optical finder unit, including their respective bending optical systems each having a zoom function can be downsized.

BRIEF DESCRIPTION OF THE SEVERAL VIEWS OF THE DRAWING

FIG. 1 is a schematic external view showing a configuration of an electronic camera according to an embodiment of the present invention;

FIG. 2 is an external, perspective view of an image pickup lens unit according to the embodiment of the present invention, from which a rear cover has been removed;

FIG. 3 is an exploded, perspective view of the image pickup lens unit according to the embodiment of the present invention, separated into a main mechanism, a zoom mechanism, and a rear cover;

FIG. 4A is a front, cross-sectional view of the principal part of the image pickup lens unit according to the embodiment of the present invention, which is set in a wide-angle state;

FIG. 4B is a front, cross-sectional view of the principal part of the image pickup lens unit according to the embodiment of the present invention, which is set in a telephoto state;

FIG. 5 is a top, cross-sectional view of the principal part of the image pickup lens unit according to the embodiment of the present invention;

FIG. 6A is a side view showing a main part of a finder driving mechanism of the image pickup lens unit according to the embodiment of the present invention, together with a driving member;

FIG. 6B is a perspective view taken along line 6B-6B of FIG. 6A;

FIG. 7 is a perspective view of the image pickup lens unit and optical finder unit according to the embodiment of the present invention, which are separated from each other in order to described a correlation between them;

FIG. 8 is a schematic plan view showing a configuration of a finder optical system of the optical finder unit according to the embodiment of the present invention;

DETAILED DESCRIPTION OF THE INVENTION

Embodiment

Figure 9:
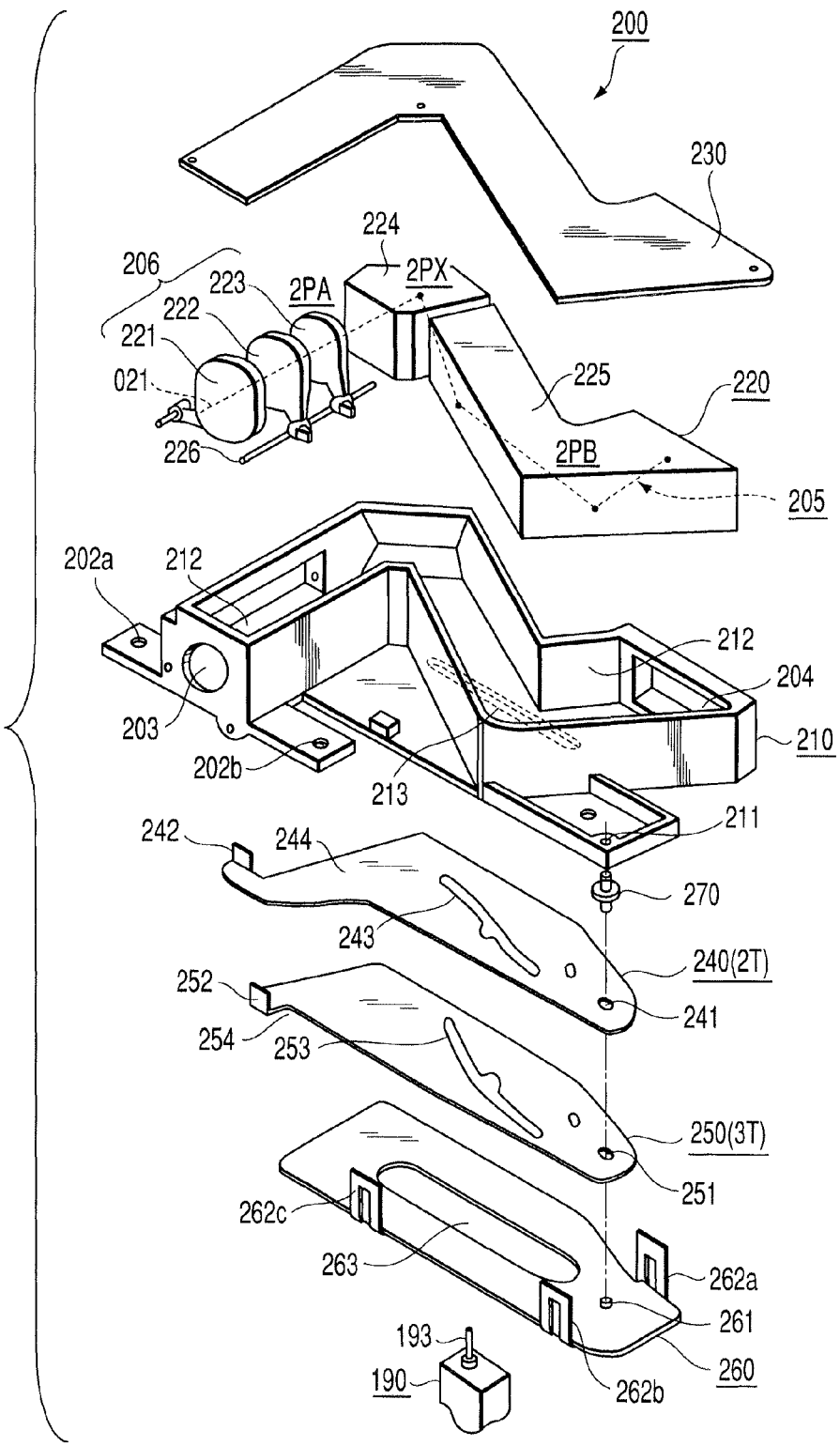
FIG. 9 is an exploded, perspective view showing a configuration of an optical finder unit according to the embodiment of the present invention.

As shown in FIG. 1, an electronic camera body 1 incorporates a picture-taking lens unit 100 including a picture-taking optical system 105 having an optical axis 011 of incident light and an optical finder unit 200 including a finder optical system 205. The units 100 and 200 are coupled integrally as one component with a narrow space therebetween. As shown, the units 100 and 200 are located on the right side of the camera body 1 when viewed from the front of the camera body.

Referring to FIGS. 2 and 3, the picture-taking lens unit 100 includes a main mechanism A and a zoom mechanism B. The mechanism B is mounted on the mechanism A integrally as one component. The main mechanism A includes an optical-axis bending mechanism 110 and a lens barrel 120 whose light-incident end is coupled to the mechanism 110.

As illustrated in FIGS. 4A, 4B and 5, the optical-axis bending mechanism 110 includes a picture-taking lens 111, a prism 112, and a holding member 113. The holding member 113 holds the picture-taking lens 111 and prism 112. The light-emitting opening end of the holding member 113 is coupled to the lens barrel 120. The optical-axis bending mechanism 110 has a bending optical system 1PX that makes up the picture-taking optical system 105. In other words, the picture-taking optical system 105 includes the bending optical system 1Px.

The bending optical system 1PX reflects light, which is incident from an object along the first optical axis (incident optical axis) 011, in a direction of a second optical axis 012 that is substantially perpendicular to the first optical axis 011 by the prism 112 serving as a reflecting member. The bending optical system along the first optical axis 011 is referred to as a pre-bending optical system 1PA and the bending optical system along the second optical axis 012 is referred to as a post-bending optical system 1PB.

The lens barrel 120 incorporates a picture-taking lens group including a first lens 121, a second lens 122 (picture-taking zoom lens), and a third lens 123 (focus lens). The picture-taking lens group (first to third lenses 121 to 123) is provided to allow an image of an object to be formed on the basis of light incident from the light-incident end. The image formed by the picture-taking lens group is photoelectrically converted by an image pickup device 126 located at the termination of the optical axis of the lens barrel 120. The image pickup device 126 has an input/output terminal series 173 (173a, 173b). An optical member 130 including a fourth lens 124 and a low-pass filter 125 is arranged along the optical axis 012 and ahead of the light-receiving surface of the image pickup device 126.

As described above, the picture-taking lens group (first to third lenses 121 to 123), the optical member 130 (fourth lens 124 and low-pass filter 125), the image pickup device 126 are all arranged in the post-bending optical system 1PB formed along the second optical axis 012.

In the present embodiment, the picture-taking optical system 105 includes the bending optical system 1PX to make up an optical system for electronic cameras including the image pickup device 126 at the termination of the second optical axis 012.

The first to third lenses 121 to 123 are held by first to third lens holding frames 131 to 133, respectively. The optical member 130 including the fourth lens 124 and low-pass filter 125 is held by a fourth holding frame 134. Of these holding frames, the second and third lens holding frames 132 and 133 are so arranged that they can be moved along the optical axis 012 by a pair of guide shafts 171 and 172 (see FIGS. 2 and 3). A shutter unit 160 is mounted ahead of the second lens holding frame 132. A driving source for driving the third lens holding frame 133, or an AF (autofocus) motor 140 serving as an actuator is mounted behind the third lens holding frame 133.

A flexible printed board 150 (151, 152) for supplying power to a driving system for the AF motor 140 and shutter unit 160 is introduced into the lens barrel 120 from outside. The flexible printed board 150 is shaped like a band such that it can be bent in its thickness direction. The end portions of the flexible printed boards 151 and 152 introduced into the lens barrel 120 are bent like a letter "U" in the same direction at substantially the same portions and then fixed to the second and third lens holding frames 132 and 133, respectively. The end portion 151a of the printed board 151 is electrically connected to a driving mechanism (not shown) of the shutter unit 160 and that 152a of the printed board 152 is electrically connected to the AF motor 140.

As depicted in FIGS. 4A and 4B, a space SA1 capable of housing the AF motor 140 is formed between the inner surface of the lens barrel 120 and one outer surface of the holding frame 134 (the upper surface thereof in FIGS. 4A and 4B) that holds the optical member 130 (fourth lens 124 and low-pass filter 125). Further, a second space SA2 capable of housing portions 151b and 152b curved by bending the flexible printed boards 151 and 152 is formed between the inner surface of the lens barrel 120 and the other outer surface of the holding frame 134 (the lower surface thereof in FIGS. 4A and 4B). The flexible printed boards 151 and 152 are housed in such a manner that their bent portions 151b and 152b overlap with each other in the second space SA2.

The first space SA1 and second space SA2 are formed in their respective first and second regions E1 and E2. The first region E1 is located above in the figures and the second region E2 is located below therein when a plane including the first and second optical axis 011 and 012 is considered to be a boundary between the regions E1 and E2.

The third lens holding frame 133 includes a limiting member 155. The limiting member 155 is used to limit a range within which the curved portions 151b and 152b of the flexible printed boards 151 and 152 vary with the movement of the lens holding frame 132 and 133.

Returning to FIG. 3, the zoom mechanism B is provided as a unit that is detachably coupled to the main mechanism A. The zoom mechanism B includes a first zoom lens moving mechanism (180 to 184, 191) and a finder driving mechanism (192, 193, etc.).

The first zoom lens moving mechanism has a zoom motor 180 serving as a driving source or an actuator mounted on a mounting frame 181, a lead screw 182 that is rotated by the power of the zoom motor 180, and a driving member 191 that is driven by the lead screw 182 and slides along a guide shaft 183 provided in parallel to the optical axis 012 to drive the zoom lens 122.

The finder driving mechanism has a sliding member 192 that slides along the guide shaft 183 in accordance with the movement of the driving member 191 and a driving pin 193 that serves as a driving-force transmitter protruded from the sliding member 192. The sliding member 192 is, as will be described later, coupled to the second lens holding frame 132 through a spring 184. The finder driving mechanism will be described in detail later.

The driving member 191, sliding member 192, and driving pin make up a displacement transfer slider 190.

The zoom mechanism B is coupled to the main mechanism A integrally as one component by screwing the zoom mechanism B into screw holes 127a and 127b of the main mechanism A through mounting holes 185a and 185b formed in the mounting frame 181 of the zoom mechanism B.

A rear cover C is attached to the main mechanism integrally as one component by securing a mounting screw 128a into a screw hole 127c of the main mechanism A through a mounting hole 128b formed in a plate-like member 128.

When the zoom mechanism B is integrated with the main mechanism A as one component, the zoom motor 180 is placed in the first region E1 together with the AF motor 140. The zoom motor 180 is located outside the front of the lens barrel 120 and close to the prism 112 within the first region E1. At least one of the first to third lenses 121 to 123 is disposed between the AF motor 140 and the zoom motor 180.

FIGS. 6A and 6B are views showing a configuration of the finder driving mechanism (192, 193) of the picture-taking lens unit 100 together with the driving member 191. FIG. 6A is a side view of the principal part of the finder driving mechanism and FIG. 6B is a perspective view taken along line 6B-6B of FIG. 6A.

The finder driving mechanism is designed to interlock a second zoom lens moving mechanism (240, 250, 270), which will be described later, with the movement of the zoom lens 122 of the picture-taking optical system 105 caused by the first zoom lens moving mechanism (180 to 184, 191) and move a zoom lens 222 of the finder optical system 205.

As shown in FIGS. 6A and 6B, the sliding member 192 is an L-shaped member having two cylindrical legs 192a and 192c at the end portions of one part thereof. The two legs 192a and 192c are located at a given distance from each other and fitted to the guide shaft 183 such that they can sandwich a cylindrical leg 191a of the driving member 191 from both ends. The legs 192a and 192c can freely slide in the axial direction of the guide shaft 183 and rotate around the guide shaft 183. The sliding member 192 has an opening 192b, which serves as a rotation range limiting mechanism, in substantially the central part of the other part of the L-shaped sliding member 192. A projection 191b formed on the top of the driving member 191 is fitted into the opening 192b with a given play.

Thus, the driving pin 193 can freely be moved in a specific direction other than the direction of the optical axis 012 (a direction perpendicular to the optical axis) within a give range of angles indicated by a double-headed arrow M and N.

A projection piece 192d is provided on the underside of the sliding member 192. An extension spring 184 serving as an urging member is provided between the projection piece 192d and a projection piece 132a of the second lens holding frame 132. Thus, the sliding member 192 is compressed and coupled to the driving member 191 by the urging force of the extension spring 184 as indicated by arrow P.

Consequently, the sliding member 192 can be moved in the direction of the optical axis 012 along the guide shaft 183 in association with the movement of the driving member 191 while it is kept rotatable around the guide shaft 183 within a range of angles corresponding to the play described above.

FIG. 7 is a perspective view showing a correlation between the picture-taking lens unit 100 and the optical finder unit 200, which are separated from each other. FIG. 8 is a schematic plan view showing a configuration of the finder optical system 205.

Referring to FIGS. 7 and 8, the picture-taking lens unit 100 includes a case 101. The case 101 incorporates the bending optical system 1PX. The case 101 has such an outside shape that length L11 is shorter than length L12. The length L11 is set in the direction parallel to the optical axis 011 of the pre-bending optical system in the bending optical system 1PX (corresponding to the thickness direction of the camera body 1). The length L12 is set in the direction parallel to the optical axis 012 of the post-bending optical system in the bending optical system 1PX (corresponding to the width direction of the camera body 1) perpendicular to the optical axis 011.

The optical finder unit 200 includes a case 201. The case 201 incorporates the bending optical system 2PX. The optical axis of the finder optical system 205 includes an optical axis 021 of incident light in a pre-bending optical system 2PA having a lens group 206 and a bent optical axis 022 including two reflections in a post-bending optical system 2PB. The incident light passes through the lens group 206 and is bent by the reflection surface of the bending optical system 2PX. The bent light is reflected two times, as shown in FIG. 8, by the action of a lens and a prism (neither of which is shown) that specifically make up the post-bending optical system 2PB and then goes into the eyes of a photographer. The case 201 has such an outside shape that the length L21 in the direction parallel to the optical axis 021 of incident light and the length L22 in the direction perpendicular thereto are approximated to their respective lengths L11 and L12 of the picture-taking lens unit 100.

The optical finder unit 200 is fixedly placed on the top surface of the picture-taking lens unit 100 with a narrow space therebetween. In other words, the optical finder unit 200 is screwed on finder-mounting bosses 129a and 129b, which are projected from the top surface of the case 101 of the picture-taking lens unit 100, through mounting holes 202a and 202b formed in the mounting section of the case 201.

Then, the optical finder unit 200 is coupled to the picture-taking lens unit 100 integrally as one unit such that the pre-bending optical system 2PA and post-bending optical system 2PB of the finder optical system 205 are arranged adjacent to the pre-bending optical system 1PA and post-bending optical system 1PB of the picture-taking optical system 105, respectively. In particular, the optical axis 021 of the pre-bending optical system 2PA in the finder optical system 205 is located immediately above the optical axis 011 of the pre-bending optical system 1PA in the picture-taking optical system 105.

In the picture-taking lens unit 100, the lens group 106 is provided in the post-bending optical system 1PB of the picture-taking optical system 105. The lens group 106 includes the picture-taking zoom lens 122. In the optical finder unit 200, the lens group 206 is provided in the pre-bending optical system 2PA of the finder optical system 205. The lens group 206 includes the zoom lens 222 for observation. The direction in which the zoom lens 122 moves is parallel to the width direction of the camera body 1, while the direction in which the zoom lens 222 moves is parallel to the thickness direction of the camera body 1. These directions are perpendicular to each other.

When the picture-taking lens unit 100 and optical finder unit 200 are completely assembled into one unit, the driving pin 193 that protrudes from the top of the unit 100 is engaged with the second zoom lens moving mechanism (described later) in the unit 200 through an opening 263 formed in the bottom of the case of the unit 200. In FIG. 7, reference numeral 103 denotes a picture-taking lens window, 203 indicates a finder front window, and 204 shows a finder eyepiece window.

FIG. 9 is an exploded, perspective view showing a configuration of the optical finder unit 200. The optical finder unit 200 includes a unit base 210, shown in the central part of FIG. 9, as a principal component. The unit base 210 includes a gutter-shaped housing recess 212 that is capable of housing an optical component 220 that makes up the finder optical system 205. Light is reflected a plurality of times at different portions and snakes in the housing recess 212. The optical component 220 includes a finder lens group 206, an optical-axis bending mechanism 224, and a barrel 225. The finder lens group 206 includes a first lens 221 (1-O), a second lens (observation zoom lens) 222 (2T), and a third lens 223 (3T). The barrel 225 includes the post-bending optical system 2PB. The opening of the housing recess 212 is closed with an upper cover 230.

A driving-pin guide section 213 having a linear groove, which is parallel to the optical axis 012 of the picture-taking lens unit 100, is provided on the bottom of the unit base 210. The guide section 213 is engaged with the driving pin 193 of the picture-taking lens unit 100, which is shown in the lower end portion of FIG. 9, and restricts the movement of the driving pin 193 in the above-described specific direction or the direction perpendicular to the optical axis 012. Thus, the driving-pin guide section 213 restricts the driving pin 193 that can freely be moved within a given range of angles.

Cam levers 240 and 250, a supporting shaft 270, etc. of the second zoom lens moving mechanism are mounted on the underside of the unit base 210 by a lever mounting plate 260. The lever mounting plate 260 has stopper pieces 262a, 262b and 262c on its circumference. These stopper pieces are used for mounting and fixing the second zoom lens moving mechanism.

The second zoom lens mechanism (240, 250, 270) moves the observation zoom lens 222 of the finder optical system 205 in the direction of the optical axis 021 of the system 205 in accordance with the movement of the driving pin 193 that is restricted by the guide section 213.

The second zoom lens moving mechanism (240, 250, 270) is so configured that the distal end portions of a plurality of cam levers (two cam levers 240 and 250 in the present embodiment) each made of a thin plate can be supported by the supporting shaft 270 and the end portions thereof can be rotated.

The cam levers 240 and 250 are formed chiefly of driving plates 244 and 245, respectively. The driving plates 244 and 245 have shaft holes 241 and 251 at the distal end portions, respectively. These holes 241 and 251 are supported by the supporting shaft 270 supported by both a bearing 211 provided on the bottom of the unit base 210 and a bearing 261 of the lever mounting plate 260. Thus, the driving plates 244 and 254 are stacked one on another such that their end portions can be rotated. The driving plates 244 and 254 have cam sections 243 and 253 of arc-shaped slits in substantially the central parts of the driving plates 244 and 254, respectively.

The driving pin 193 passes through the opening 263 of the lever mounting plate 260 and then through the cam sections 253 and 243. The end portion of the driving pin 193 is engaged with the driving-pin guide section 213 of the linear groove.

As the driving pin 193 moves in the direction of the optical axis 012, the cam levers 240 and 250 rotate based on amounts of movement corresponding to the shapes of the cam sections 243 and 253, respectively. Consequently, an amount of movement of the picture-taking zoom lens 122 of the picture-taking optical system 105 is converted to that of movement of the lens group of the finder optical system 205. The converted movement amount is transferred to the second lens group 222 and third lens group 223 by movement operating sections 242 and 252 provided at their respective ends of the driving plates 244 and 254.

As a result, at least the displacement of the picture-taking lens 122 is transferred to the observation zoom lens 222 by the displacement transfer mechanism (190, 240, 250, 270, etc.).

Figure 10:
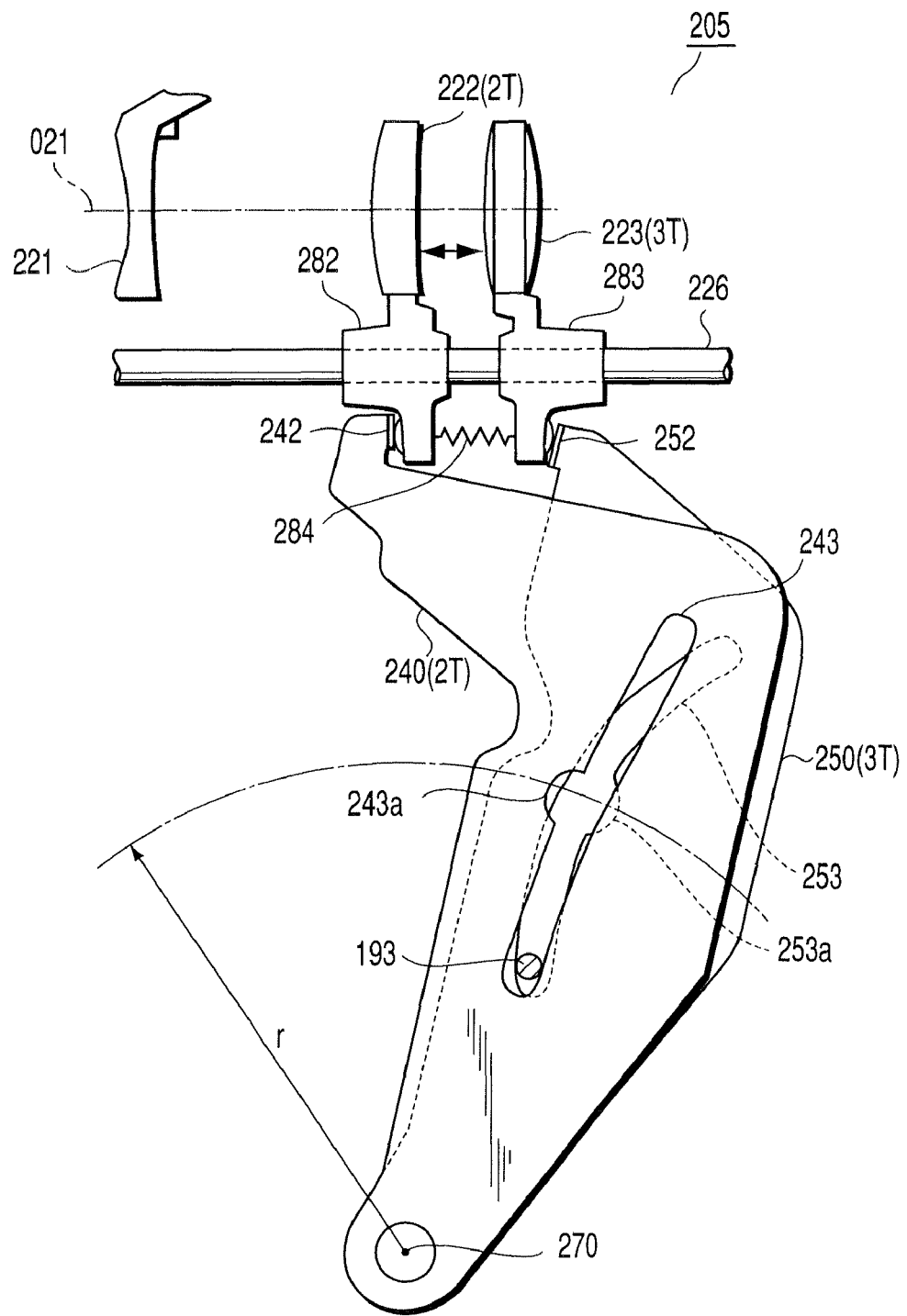
FIG. 10 is a view showing a relationship (wide state) between a cam lever and a plurality of movable lenses including an observation zoom lens in a finder optical system according to the embodiment of the present invention.
Figure 11:
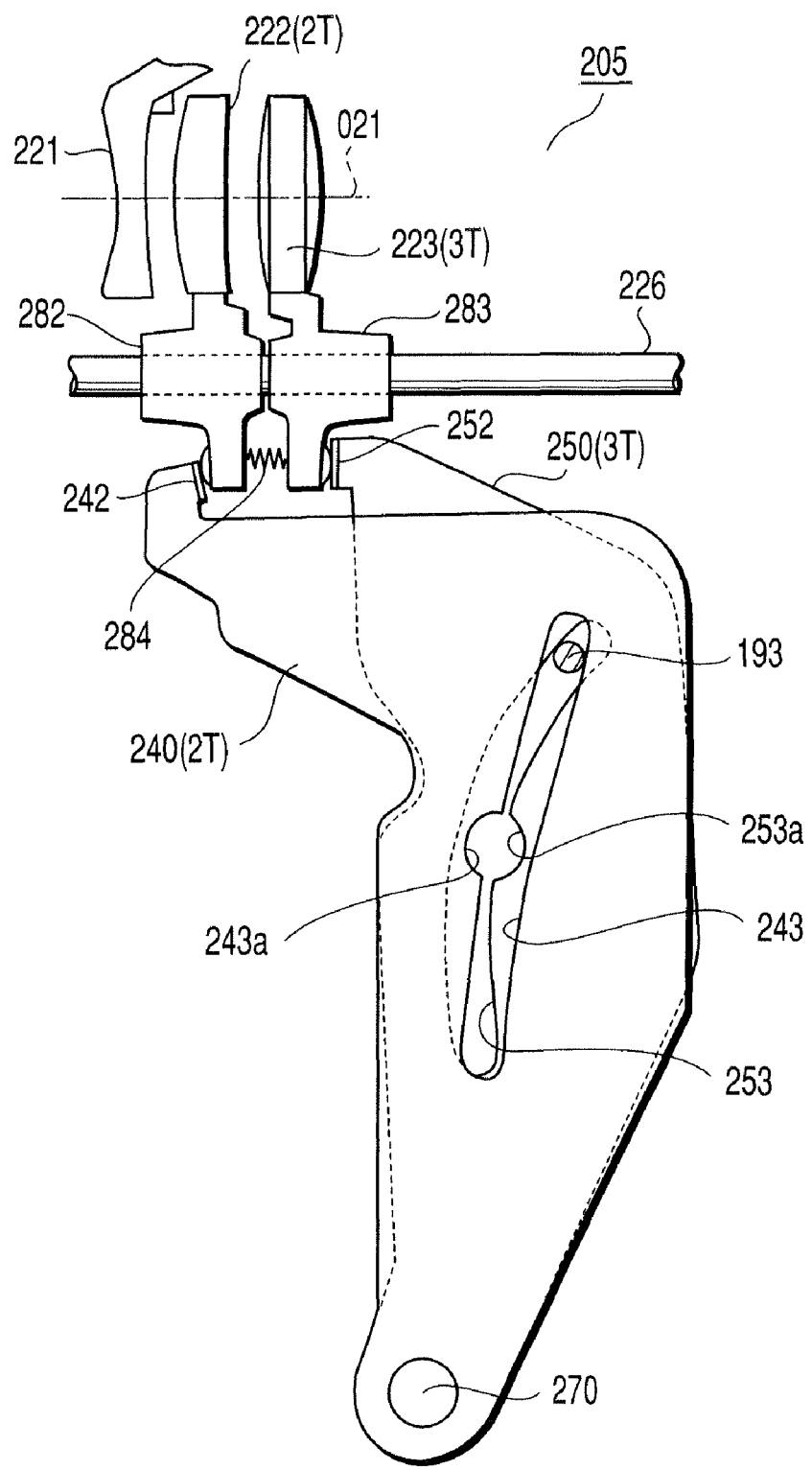
FIG. 11 is a view showing a relationship (telephoto state) between a cam lever and a plurality of movable lenses including an observation zoom lens in a finder optical system according to the embodiment of the present invention.

FIGS. 10 and 11 are views each showing a relationship between the cam levers 240 and 250 and a plurality of moving lenses (two moving lenses 222 and 223 in the present embodiment) including an observation zoom lens in the finder optical system. FIG. 10 shows a wide-angle state and FIG. 11 shows a telephoto state.

Referring to FIGS. 10 and 11, the two moving lenses 222 and 223 are urged in opposite directions along the optical axis 021 of the finder optical system 205, as indicated by a double-headed arrow, by means of an urging member 284 in a compressed state. The movement operating sections 242 and 252 of the cam levers 240 and 250 contact their respective lens moving frames 282 and 283, which are integrated with their respective moving lenses 222 and 223, so as to locate the moving lenses 222 and 223 in given positions against the urging force under the control of the driving pin 193 engaged with each of the cam sections 243 and 253.

In each of the cam sections 243 and 253 of the cam levers 240 and 250, one of both sides of a slit is considered to be a cam surface that is effective in fulfilling a cam function. More specifically, in the cam section 243, one side (right side in FIGS. 10 and 11) in the direction of rotation against the urging force of the urging member 284 in the compressed state is considered to be a cam surface. In the cam section 253, one side (left side in FIGS. 10 and 11) in the direction of rotation against the urging force of the urging member 284 in the compressed state is also considered to be a cam surface. If, therefore, the driving pin 193 moves in the direction of the optical axis 012 (up and down directions in FIGS. 10 and 11), the moving lenses 222 and 223 move in a direction perpendicular to the moving direction of the driving pin 193.

Pin-inserting notches 243a and 253a are formed in the central parts of the sides opposed to the cam surfaces of the slit of the cam sections 243 and 253, respectively. Each of the notches 243a and 253a is a portion of the slit that is widened to easily insert the driving pin 193 therein at the time of assembly. In the present embodiment, the notches 243a and 253a are substantially semicircular as depicted in FIGS. 10 and 11. The semicircles of the two notches 243a and 253a are opposed to each other, and the notches are located at a radius of r of the supporting shaft 270.

Figure 12:
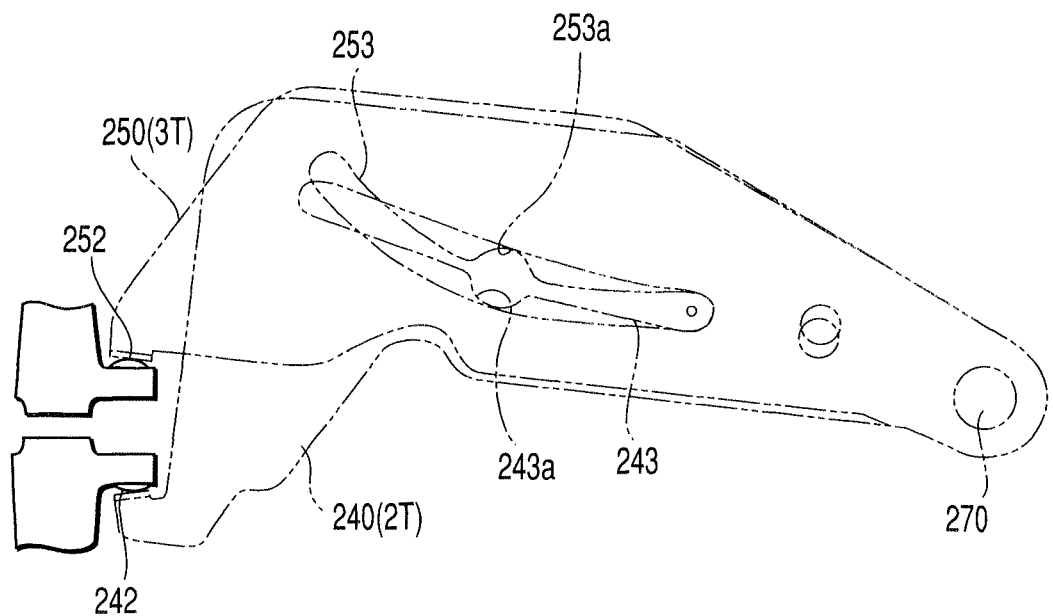
FIG. 12 is a view showing a step of inserting a driving pin in a cam section using a pin-inserting notch according to the embodiment of the present invention.

FIG. 12 shows a step of inserting the driving pin 193 in the cum sections 243 and 253 using the pin-inserting notches 243a and 253a. As shown in FIG. 12, the rotation positions of the cam levers 240 and 250 are finely adjusted to detect a position in which the two notches 243a and 253a are formed into a single circular hole. The single circular hole is so preset that its diameter is slightly larger than the outside diameter of the driving pin 193. The driving pin 193 has only to be inserted into the slightly larger circular hole at the time of assembly. Consequently, the driving pin 193 can be inserted into the slit of the cam sections 243 and 253 very easily.

Figure 13:
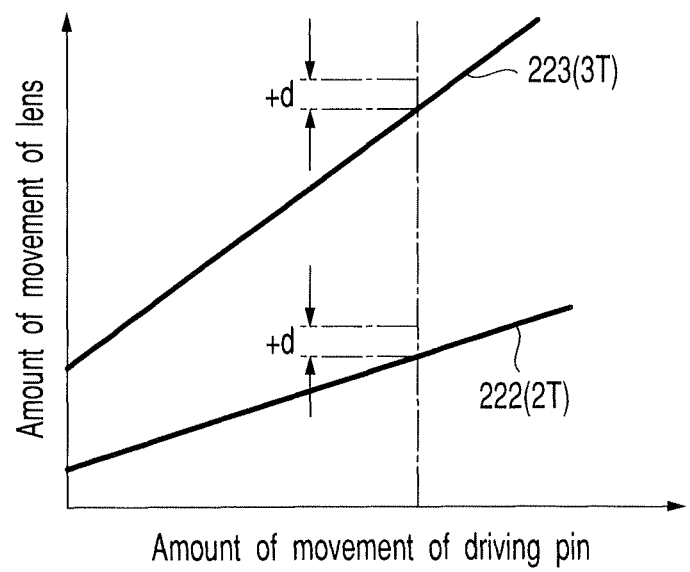
FIG. 13 is a graph schematically showing the relationship between the amount of movement of a driving pin and that of movement of a movable lens according to the embodiment of the present invention.

FIG. 13 is a graph schematically showing a relationship between an amount of movement of the driving pin 193 and that of movement of the moving lenses 222 and 223. Referring to FIG. 13, as the amount of movement of the driving pin 193 increases, both the moving lenses 222 and 223 move at different rates of change as indicated by straight lines whose slopes are different (actually nonlinear curves). Thus, the moving lenses 222 and 223 including the observation zoom lens 222 move so as to have a given zoom ratio in association with the movement of the picture-taking zoom lens 122.

Now, assuming that the driving pin 193 is displaced in a specific direction perpendicular to the direction of the optical axis 012 due to an error in mounting position or the like, the displacement makes the zoom ratio of the finder optical system 205 inaccurate. Assuming that the driving pin 193 is displaced by +d in a specific direction from a given position S1 as shown in FIG. 13, the moving lenses 222 and 223 each move by a fixed amount +d. Consequently, a correlation in rate of change of movement between the two moving lenses 222 and 223 is impaired and the normal zoom ratio cannot be maintained.

In the present embodiment, however, the guide section 213 strictly restricts the displacement of the free driving pin 193 in a specific direction. Thus, a relative-mounting error between the picture-taking lens unit 100 and the optical finder unit 200 is absorbed by the action of the free driving pin 193, and the displacement of the driving pin 193 in the specific direction is strictly restricted by the guide section 213, with the result that there is no fear that the zoom ratio will become inaccurate.

Features of the Embodiment

[1] A camera according to the embodiment, comprises:

a picture-taking lens unit 100 including a picture-taking optical system 105 having a bending optical system 1PX which optically bends incident light; and optical system 205 having a bending optical system 2PX which optically bends incident light, wherein a pre-bending optical system 2PA and a post-bending optical system 2PB in the bending optical system 2PX of the optical finder unit 200 are arranged adjacent to a pre-bending optical system 1PA and a post-bending optical system 1PB in the bending optical system 1PX of the picture-taking lens unit 100, respectively.

In the camera described above, both the picture-taking lens unit 100 and the optical finder unit 200 are assembled into one unit such that the pre-bending optical systems 1PA and 2PA correspond to each other and the post-bending optical systems 1PB and 2PB correspond to each other. Therefore, the body of the camera comprising the picture-taking lens unit 100 including the bending optical system 1PX and the optical finder unit 200 including the bending optical system 2PX can be made thin and compact properly.

[2] A camera according to the embodiment, comprises:

a picture-taking lens unit 100 including a picture-taking optical system 105 having a bending optical system 1PX which optically bends incident light; and an optical finder unit 200 including a finder optical system 205 having a bending optical system 2PX which optically bends incident light, wherein the picture-taking lens unit 100 has such an outside shape that a length L11 thereof in a direction parallel to an optical axis 011 of the pre-bending optical system 1PA in the bending optical system 1PX is shorter than a length L12 thereof in a direction perpendicular to the optical axis 011 of the pre-bending optical system 1PA, the optical finder unit 200 has such an outside shape that a length L21 thereof in a direction parallel to an optical axis 021 of the pre-bending optical system 2PA in the bending optical system 2PX and a length L22 thereof in a direction perpendicular to the optical axis 021 of the pre-bending optical system 2PA are approximated to the lengths L11 and L12, respectively, and the picture-taking lens unit 100 and the optical finder unit 200 are arranged close to each other such that a pre-bending optical system 2PA and a post-bending optical system 2PB of the bending optical system 2PX in the finder optical system 205 are arranged adjacent to a pre-bending optical system 1PA and a post-bending optical system 1PB of the bending optical system 1PX in the picture-taking optical system 105, respectively.

In the foregoing camera, the picture-taking lens unit 100 and optical finder unit 200 have similar shapes and dimensions and are arranged close to each other. The camera, which is equipped with an optical finder having bending optical systems 1PX and 2PX, can be made compact.

[3] In the camera according to the embodiment, described in above paragraph [2], the optical axis 011 (optical axis of incident light) of the pre-bending optical system 1PA in the picture-taking optical system 105 is parallel to the thickness direction of a camera body 1, and the optical axis 012 of the post-bending optical system 1PB in the picture-taking optical system 105 is parallel to the width direction of the camera body 1.

[4] In the camera according to the embodiment, described in above paragraph [3], the picture-taking lens unit 100 and the optical finder unit 200 are arranged such that the optical axis 021 (optical axis of incident light) of the pre-bending optical system 2PA in the finder optical system 205 is located immediately above the optical axis 011 (optical axis of incident light) of the pre-bending optical system 1PA in the picture-taking optical system 105.

In the camera described above, the optical axis 011 in the picture-taking optical system 105 and the optical axis 012 in the finder optical system 205 are close to each other. A parallax therefore becomes low.

[5] In the camera according to the embodiment, described in one of above paragraphs [3] and [4], the picture-taking lens unit 100 and the optical finder unit 200 are arranged on the right side of the camera body 1 when viewed from the front of the camera.

[6] In the camera according to the embodiment, described in one of above paragraphs [1] to [5], the picture-taking optical system 105 of the picture-taking lens unit 100 is an optical system for electronic cameras which includes an image pickup device 126 at the termination of the optical axis 012 of the post-bending optical system 1PB of the bending optical system 1PX.

[7] A camera according to the embodiment, comprises:

a picture-taking lens unit 100 including a picture-taking optical system 105 having a bending optical system 1PX which optically bends incident light and a picture-taking zoom lens 122 provided movably in the direction of an optical axis 012; and an optical finder unit 200 including a finder optical system 205 having a bending optical system 2PX which optically bends incident light and an observation zoom lens 222 provided movably in the direction of an optical axis 021, wherein a pre-bending optical system 2PA and a post-bending optical system 2PB in the bending optical system 2PX of the optical finder unit 200 are arranged adjacent to a pre-bending optical system 1PA and a post-bending optical system 1PB in the bending optical system 1PX of the picture-taking lens unit 100, respectively.

In the foregoing camera, the pre-bending optical systems 1PA and 2PA of the picture-taking lens unit 100 and optical finder unit 200 are arranged adjacent to each other, as are the post-bending optical systems 1PB and 2PB thereof. No wasted space is therefore difficult to create at the time of assembly of both the units 100 and 200, and the camera as a whole can be made thin and compact. This arrangement contributes to a downsizing of the camera including the bending optical systems 1PX and 2PX and the zoom lenses 122 and 222.

[8] In the camera according to the embodiment, described in above paragraph [7], the picture-taking zoom lens 122 of the picture-taking lens unit 100 is provided in the post-bending optical system 1PB of the picture-taking optical system 105, the observation zoom lens 222 of the optical finder unit 200 is provided in the pre-bending optical system 2PA of the finder optical system 205, and a displacement transfer mechanism (190, 240, 250, 270) transfers a displacement of the picture-taking zoom lens 122 to the observation zoom lens 222.

In the camera described above, the post-bending optical system 1PB of the picture-taking optical system 105 incorporates an optical system 106 including the picture-taking zoom lens 122 which requires a relatively large space. The pre-bending optical system 2PA of the finder optical system 205 incorporates an optical system 206 including the observation zoom lens 222 which requires a relatively small space. Thus, the pre-bending optical systems 1PA and 2PA of the picture-taking lens unit 100 and optical finder unit 200 are both relatively short, and the post-bending optical systems 1PB and 2PB thereof are relatively long. Consequently, the picture-taking lens unit 100 and optical finder unit 200 have similar outside shapes and can thus be arranged with efficiency.

[9] In the camera according to the embodiment, described in above paragraph [8], the observation zoom lens 222 moves in a direction perpendicular to a direction in which the picture-taking zoom lens 122 moves.

[10] In the camera according to the embodiment, described in above paragraph [9], the picture-taking zoom lens 122 moves in a direction parallel to the width direction of a camera body 1, and the observation zoom lens 222 moves in a direction parallel to the thickness direction of the camera body 1.

In the above-described camera, since the picture-taking zoom lens 122, which requires a relatively large stroke, moves in a direction parallel to the width direction of the camera body 1, it does not increase the thickness of the camera body 1. The camera can thus be thinned without any trouble.

The pre-bending optical system 2PA, which is an objective system for the finder optical system 205, incorporates an optical system 206 including the observation zoom lens 222. Therefore, the camera requires no additional optical components but can be made up of only the minimum optical components, as compared with the case where the optical system including the observation zoom lens 222 is provided in the post-bending optical system 2PB that is an eyepiece system for the finder optical system 205. Since, moreover, the optical components can be held in a space along the thickness direction of the camera body 1, which is not so large, they can be arranged with a good space factor.

[11] In the camera according to the embodiment, described in one of above paragraphs [7] to [10], the picture-taking optical system 105 of the picture-taking lens unit 100 is an optical system for electronic cameras which includes an image pickup device 126 at the termination of the optical axis 012 of the post-bending optical system 1PB of the bending optical system 1PX.

[12] A camera according to the embodiment, comprises:

a camera body 1;

a first zoom lens moving mechanism (180 to 184, 191) which moves a picture-taking zoom lens 122 of a picture-taking optical system 105 of the camera body 1 in the direction of an optical axis 012 of the picture-taking optical system 105;

a second zoom lens moving mechanism (240, 250, 270) which moves an observation zoom lens 222 of a finder optical system 205 of the camera body 1 in the direction of an optical axis 021 of the finder optical system 205; and a finder driving mechanism (192, 193) which interlocks the first zoom lens moving mechanism (180 to 184, 191) with the second zoom lens moving mechanism (240, 250, 270) to move the observation zoom lens 222 in accordance with the movement of the picture-taking zoom lens 122 of the picture-taking optical system 105, wherein the finder driving mechanism (192, 193) includes a driving-force transmitter (driving pin) 193 which is provided movably in a specific direction other than the direction of the optical axis 012.

In the camera described above, even though there is a variation in mounting dimensions between the picture-taking optical system 105 and the finder optical system 205, a displacement in position due to the variation is absorbed by the movement of the driving-force transmitter 193 in the specific direction. The driving-force transmitter 193 can thus reliably be fitted to a given position of the finder optical system 205. Consequently, both the picture-taking optical system 105 and the finder optical system 205 can be assembled properly without strictly adjusting a relative position between these systems 105 and 205.

[13] In the camera according to the embodiment, describe in above paragraph [12], the specific direction is perpendicular to the optical axis.

[14] In the camera according to the embodiment, described in one of above paragraphs [12] and [13], the first zoom lens moving mechanism (180 to 184, 191) includes a guide shaft 183 provided in parallel to the optical axis 012 of the picture-taking optical system 105 and a driving member (nut) 191 which slides along the guide shaft 183 to drive the zoom lens 122; and the finder driving mechanism (192, 193) includes:

a sliding member 192 which is slidably fitted to the guide shaft 183 to move in the direction of the optical axis 012 and rotate around the guide shaft 183 in association with the driving member (nut) 191, and a driving-force transmitter (driving pin) 193 mounted on the sliding member 192, which transmits the movement of the sliding member 192 to the finder optical finder unit 200.

In the foregoing camera, since the driving-force transmitter (driving pin) 193 is mounted on the sliding member 192 that is provided rotatably around the guide shaft 183, it can easily be moved in a direction perpendicular to the optical axis 012.

[15] In the camera according to the embodiment, described in above paragraph [14], the finder driving mechanism (192, 193) is compressed by an urging member (extension spring 184) and coupled to the first zoom lens moving mechanism (180 to 184, 191).

In the camera described above, the first zoom lens moving mechanism (180 to 184, 191) and the finder driving mechanism (192, 193) are formed integrally as one unit without any play between them. These mechanisms can thus be interlocked with each other smoothly.

[16] The camera according to the embodiment, described in one of above paragraphs [14] and [15], further comprises a limiting mechanism (projection 191b and fitting hole 192b) which limits a range of angles within which the finder driving mechanism (192, 193) rotates in a specific direction by fitting part of the driving member (nut) 191 and part of the sliding member 192 to each other with a given play.

In the foregoing camera, the range of angles is limited to a predetermined range that depends upon the amount of clearance of a portion at which the driving member and the sliding member are fitted to each other. Thus, a useless rotating operation need not be performed to facilitate an assembling operation. Since, moreover, the limiting mechanism can be formed only by fitting part of the driving member (nut) 191 and that of the sliding member 192 to each other with a play, no special additional members are required, with the result that the camera can be manufactured at low cost.

[17] In the camera according to the embodiment, described in one of above paragraphs [14] to [16], the sliding member 192 has legs 192a and 192c at both ends thereof, the legs being fitted to the guide shaft 183 such that the legs sandwich the driving member (nut) 191 from both ends in the direction of the optical axis 012.

In the camera described above, the driving member (nut) 191 and the sliding member 192 are coupled to each other such that the sliding member 192 catches the driving member 191 from both ends. An interlocking operation between these members is therefore performed with reliability.

[18] In the camera according to the embodiment, described in one of above paragraphs [12] to [17], the first zoom lens moving mechanism (180 to 184, 191) and the finder driving mechanism (192, 193) are provided as a zoom mechanism B which is detachably coupled to a main mechanism A including the zoom lens 122 of the camera body 1.

In the above-described camera, the first zoom lens moving mechanism (180 to 184, 191) and the finder driving mechanism (192, 193) are each formed as a unit; therefore, they are excellent in their assembly and maintenance.

[19] In the camera according to the embodiment, described in above paragraph [18], the first zoom lens moving mechanism (180 to 184, 191) includes a driving source (zoom motor) 180, a lead screw 182 which is rotated by power of the driving source 180, and a driving member (nut) 191 which is driven by the lead screw 182 to move the zoom lens 122 of the picture-taking optical system 105 in the direction of the optical axis 012 of the picture-taking optical system 105.

[20] A camera according to the embodiment, comprises:

a picture-taking lens unit 100 including a picture-taking optical system 105 having a picture-taking zoom lens 122 which is movable in the direction of an optical axis 012; and an optical finder unit 200 including a finder optical system 205 having an observation zoom lens 222 which is movable in the direction of an optical axis 021 in association with the movement of the picture-taking zoom lens 122 of the picture-taking lens unit 100, wherein the picture-taking lens unit 100 further includes a driving-force transmitter (driving pin) 193 which moves in the direction of the optical axis 012 as the picture-taking zoom lens 122 moves in the direction of the optical axis 012 and which freely moves in a specific direction other than the direction of the optical axis, and the optical finder unit 200 further includes:

a guide section 213 which restricts the movement of the driving-force transmitter 193 in the specific direction and allows the driving-force transmitter to move in the direction of the optical axis 012; and a second zoom lens moving mechanism (240, 250, 270) which moves the observation zoom lens 222 in accordance with the movement of the driving-force transmitter (driving pin) 193, which is restricted by the guide section 213, so as to make a zoom ratio of the optical finder unit 200 equal to a given zoom ratio.

In the foregoing camera, even though there is a variation in mounting dimensions between the picture-taking optical system 105 and the finder optical system 205, a displacement in position due to the variation is absorbed by the movement of the driving-force transmitter (driving pin) 193 in the specific direction. The driving-force transmitter (driving pin) 193 can properly be fitted to the guide section 213 which is correctly formed in advance in a given position of the optical finder unit 200. Consequently, both the picture-taking lens unit 100 and the optical finder unit 200 can be assembled properly without making any special adjustment to a relative position between these units 100 and 200. Further, the movement of the driving-force transmitter (driving pin) 193 in the specific direction is restricted by the guide section 213 with very reliability. Consequently, a difference in zoom ratio between the picture-taking optical system 105 and the finder optical system 205 can be prevented from occurring, and an observation function of the optical finder due to the difference in zoom ratio can be prevented from deteriorating.

[21] In the camera according to the embodiment, described in above paragraph [20], the guide section 213 is a groove formed in a case 210 of the optical finder unit 200 in parallel to the optical axis 012 of the picture-taking lens unit 100, the second zoom lens moving mechanism (240, 250, 270) includes cam levers 240 and 250 having cam sections 243 and 253 which convert an amount of movement of the driving-force transmitter 193 into an amount of movement of the observation zoom lens 222 of the optical finder unit 200, the cam levers 240 and 250 rotating around a supporting shaft 270, and the driving-force transmitter (driving pin) 193 are fitted into both the guide section 213 and the cam sections 243 and 253.

[22] In the camera according to the embodiment, described in above paragraph [21], the driving-force transmitter (driving pin) 193 passes through the cam sections 243 and 253 formed in the cam levers 240 and 250 as openings (arc-shaped slits) such that an end portion of the driving-force transmitter is fitted into the groove of the guide section 213.

In the camera described above, the cam levers 240 and 250 can correctly be rotated through a relative movement between the single driving-force transmitter (driving pin) 193 guided by the groove of the guide section 213 and the cam sections 243 and 253 through which the driving-force transmitter 193 passes. The camera can thus be configured simply and compactly.

[23] In the camera according to the embodiment, described in above paragraph [22], the cam levers 240 and 250 whose number corresponds to that of a plurality of zoom lenses 222 and 223 which move differently from each other in the finder optical system 205 are stacked, and the driving-force transmitter (driving pin) 193 is provided so as to pass through the cam sections 243 and 253 of the cam levers 240 and 250.

In the above-described camera, the cam sections 243 and 253 each corresponding to a zoom lens to be driven have only to be formed in their respective cam levers 240 and 250. The camera is therefore simple in configuration and easy to manufacture.

[24] An optical finder according to the embodiment comprises a finder optical system 205 having a plurality of moving lenses 222 and 223 including an observation zoom lens 222 which is movable in the direction of an optical axis 021, and a moving mechanism which moves the plurality of moving lenses 222 and 223 of the finder optical system 205 in association with the movement of a picture-taking zoom lens 122 of a picture-taking optical system 105, wherein the moving mechanism includes:

a plurality of driving plates 244 and 254 which are stacked one on another such that the driving plates are rotatable;

cam sections 243 and 253 provided on the plurality of driving plates 244 and 254, respectively and fitted to a driving-force transmitter (driving pin) 193 which moves as the picture-taking zoom lens 122 of the picture-taking optical system 105 moves, the cam sections 243 and 253 converting a movement of the driving-force transmitter 193 into a rotating operation of each of the driving plates 244 and 254; and movement operating sections 242 and 252 which are provided in the driving plates 244 and 254 rotated by action of the cam sections 243 and 253 to move the plurality of moving lenses 222 and 223 in the finder optical system 205.

In the optical finder described above, the plurality of driving plates 244 and 254 are stacked one on another. The area of the driving plates occupied in an optical finder unit 200 can thus be decreased, as compared with the case where a plurality of cam sections are arranged on a single driving plate. Since, moreover, no gap is formed between the stacked driving plates 244 and 254, there is no fear that the camera will increase in volume (thickness) even though a number of driving plates are used. Consequently, the second zoom lens moving mechanism (240, 250, 270) of the optical finder can be reduced in size.

[25] In the optical finder according to the embodiment, described in above paragraph [24], the plurality of cam sections 243 and 253 are fitted in common to a single driving-force transmitter (driving pin) 193.

[26] In the optical finder according to the embodiment, described in above paragraph [25], the plurality of driving plates 244 and 254 rotate around the same axis.

In the foregoing optical finder, the second zoom lens moving mechanism (240, 250, 270) are simple in configuration and the area thereof occupied in the optical finder unit 200 can be decreased.

[27] In the optical finder described in one of above paragraphs [24] to [26], the plurality of moving lenses 222 and 223 are urged in directions opposite to each other along the optical axis 021 by an urging member 284 and moved to respective positions against an urging force by the moving operating sections 242 and 252 of the plurality of driving plates 244 and 255.

[28] In the optical finder according to the embodiment, described in above paragraph [27], the cam sections 243 and 253 of the driving plates 244 and 254 each have a cam surface, the cam surface corresponding to one of both sides of a slit formed in each of the driving plates 244 and 254, the one of both sides being located in the direction of rotation of the driving plates 244 and 254 against the urging force.

In the foregoing optical finder, one side of a slit, which is located in the direction of rotation of the driving plates 244 and 254 against the urging force, is considered to be a cam surface for controlling a position of the rotation of the driving plates 244 and 254. Therefore, the movement of the moving lenses 222 and 223 can be controlled with very high precision.

[29] In the optical finder according to the embodiment, described in one of above paragraphs [24] to [28], the moving operating sections 242 and 252 are provided at respective distal ends of the plurality of driving plates 244 and 254 which are rotated by action of the cam sections 243 and 253.

In the above optical finder, the plurality of moving lenses 222 and 223 can be moved with efficiency.

[30] In the optical finder according to the embodiment, described in above paragraph [28], the cam sections 243 and 253 include wide notches 243a and 253a through which the driving-force transmitter (driving pin) 193 is inserted, each of the notches 243a and 253a being formed in part of the side opposed to the cam surface of the slit.

In the optical finder described above, the driving-force transmitter (driving pin) 193 can easily be fitted into the cam sections 243 and 253 of the plurality of driving plates 244 and 254. The assembling operation is therefore simplified.

[31] In the optical finder according to the embodiment, described in one of above paragraphs [24] to [30], the plurality of moving lenses 222 and 223 move in a direction perpendicular to the direction in which the driving-force transmitter (driving pin) 193 moves.

[32] A camera comprises:

a picture-taking lens unit 100 including a picture-taking optical system 105 having a bending optical system 1PX which optically bends incident light and a plurality of moving lenses 122 and 123 including a picture-taking zoom lens 122 provided in a post-bending optical system 1PB of the bending optical system 1PX;

an optical finder unit 200 including a finder optical system 205 having a plurality of moving lenses 222 and 223 including an observation zoom lens 222 provided along an optical axis 021 of incident light parallel to an optical axis 011 of the picture-taking lens unit 100; and a lens moving mechanism which moves the plurality of moving lenses 222 and 223 in association with the picture-taking zoom lens 122, wherein the lens moving mechanism includes:

a plurality of driving plates 244 and 254 which are stacked one on another in the optical finder unit 200 such that the distal ends thereof are rotated with regard to the proximal ends thereof;

cam sections 243 and 253 provided in the driving plates 244 and 254, respectively and fitted to a driving-force transmitter (driving pin) 193 which moves together with the picture-taking zoom lens 122 of the picture-taking optical system 105, the cam sections 243 and 253 converting a movement of the driving-force transmitter 193 into a rotating operation of each of the driving plates 244 and 254; and moving operating sections 242 and 252 provided at the respective distal ends of the driving plates 244 and 254, which are rotated by action of the cam sections 243 and 253, the moving operating sections 242 and 252 moving the moving lenses 222 and 223 including the observation zoom lens 222 of the finder optical system 205.

In the above-described camera, the picture-taking lens unit 100 and the optical finder unit 200 including their respective bending optical systems 1PX and 2PX each having a zoom function can be downsized.

[33] A picture-taking lens unit 100 according to the embodiment, comprises:

a lens barrel 120 having a light-incident end;

a picture-taking lens group (first to third lenses 121 to 123) which is provided so as to form an image of an object based on light incident from the light-incident end of the lens barrel 120;

an image pickup device 126 provided in the lens barrel 120 to photoelectrically convert the image of the object formed by the picture-taking lens group (first to third lenses 121 to 123);

an optical member 130 (fourth lens 124 and low-pass filter 125) arranged along an optical axis of the picture-taking lens group (first to third lenses 121 to 123) and ahead of a light-receiving surface of the image pickup device 126;

a lens holding frame (second and third lens frames 132 and 133) which holds a specific lens (second and third lenses 122 and 133) of the picture-taking lens group (first to third lenses 121 to 123), the lens holding frame being provided movably along the optical axis 012 of the picture-taking lens group (first to third lenses 121 to 123); and an actuator (AF motor 140) mounted on the lens holding frame (third lens frame 133), which controls a movement of the lens holding frame (third lens frame 133), wherein a space SA1 which houses the actuator (AF motor 140) is formed between an inner surface of the lens barrel 120 and one outer surface of the optical member 130 (fourth lens 124 and low-pass filter 125).

In the above picture-taking lens unit 100, since the space SA1 is used to house the actuator (AF motor 140), the space in the lens barrel 120 is effectively used, which contributes to a downsizing and thinning of the unit.

[34] The picture-taking lens unit 100 according to the embodiment, described in above paragraph [33], further comprises a band-shaped flexible printed board 150 which is bent in a thickness direction and provided to supply power to a driving system including the actuator (AF motor 140), and wherein a first space SA1 which houses the actuator (AF motor 140) is formed between an inner surface of the lens barrel 120 and one outer surface of the optical member 130 (fourth lens 124 and low-pass filter 125), and a second space SA2 which houses a portion curved by bending the flexible printed board 150 is formed between the inner surface of the lens barrel 120 and the other outer surface of the optical member 130 (fourth lens 124 and low-pass filter 125).

In the foregoing picture-taking lens unit 100, the first and second spaces SA1 and SA2 are formed between the inner surface of the lens barrel 120 and both the outer surfaces of the optical member 130 (fourth lens 124 and low-pass filter 125) to house the actuator (AF motor 140) and the curved portion of the flexible printed board 150. Therefore, the space in the lens barrel 120 is used more effectively and the unit 100 can be further downsized and thinned.

[35] The picture-taking lens unit 100 according to the embodiment, described in one of above paragraphs [33] and [34], further comprises a picture-taking optical system 105 including a bending optical system 1PX which reflects light incident from the object along a first optical axis 011 in a direction of a second optical axis 012, which is substantially perpendicular to the first optical axis 011, by a reflecting member (prism 112, etc.), wherein the picture-taking lens group (first to third lenses 121 to 123), the optical member 130 (fourth lens 124 and low-pass filter 125), and the image pickup device 126 are arranged along the second optical axis 012.

The same advantages as those of the picture-taking lens unit 100 described in above paragraph [33] or [34] are obtained from the above picture-taking lens unit 100 comprising a picture-taking optical system 105 including a bending optical system 1PX.

[36] The picture-taking lens unit 100 according to the embodiment, described in above paragraphs [34], further comprises a picture-taking optical system 105 including a bending optical system 1PX which reflects light incident from the object along a first optical axis 011 in a direction of a second optical axis 012, which is substantially perpendicular to the first optical axis 011, by a reflecting member (prism 112, etc.), wherein the picture-taking lens group (first to third lenses 121 to 123), the optical member 130 (fourth lens 124 and low-pass filter 125), and the image pickup device 126 are arranged along the second optical axis 012, and the first space SA1 and the second space SA2 are formed in a first region E1 and a second region E2, respectively when a plane including the first and second optical axes 011 and 012 is considered to be a boundary between the first and second regions E1 and E2.

The same advantages as those of the lens unit 100 described in above paragraph [34] are obtained more reliably from the picture-taking lens unit 100 comprising a picture-taking optical system including a bending optical system 1PX. Consequently, when the lens unit is applied to an electronic camera, the camera body 1 can be compacted more reliably.

[37] In the picture-taking lens unit 100 according to the embodiment, described in one of above paragraphs [34] and [36], the flexible printed board 150 includes a plurality of flexible printed boards 151 and 152, and the printed boards 151 and 152 are bent in the same direction at substantially the same portions thereof to form curved portions 151b and 152b, the curved portions 151b and 152b overlapping with each other in the second space SA2.

In the above picture-taking lens unit 100, the curved portions 151b and 152b caused by bending the flexible printed boards 151 and 152 are housed together in the second space SA2. Thus, as compared with the case where the flexible printed boards 151 and 152 are housed separately, the space of the barrel can be used effectively and the picture-taking lens unit 100 can be downsized and thinned.

[38] In the picture-taking lens unit 100 according to the embodiment, described in one of above paragraphs [34], [36] and [37], one end portions 151a and 152a of the flexible printed boards 151a and 152a are fixed in a given position of the lens holding frames 132 and 133, respectively, and a limiting member 155 is provided to limit a range within which the curved portions 151b and 152b of the flexible printed boards 151 and 152 vary with a movement of the lens holding frames 132 and 133.

In the picture-taking lens unit 100 described above, even though the flexible printed boards 151, 152 are bent greatly as the lens holding frames 132 and 133 moves, the limiting member 155 limits the movement of the curved portions 151b and 152b of the flexible printed boards 151 and 152 to a predetermined range. Thus, there is no fear that part of the flexible printed boards 151 and 152 goes into an optical path of the picture-taking optical system 105 to block the optical path.

[39] A picture-taking lens unit 100 according to the embodiment, including a picture-taking optical system 105 having a bending optical system 1PX which reflects light incident from an object along a first optical axis 011 in a direction of a second optical axis 012, which is substantially perpendicular to the first optical axis 011, by a reflecting member (prism 112, etc.), comprises:

a lens barrel 120 having a light-incident end;

a picture-taking lens group (first to third lenses 121 to 123) including at least a zoom lens group (second lens 122) and a focus lens group (third lens 123) and provided to form an image of the object based on light incident from the light-incident end of the lens barrel 120;

an image pickup device 126 provided in the lens barrel 120 to photoelectrically convert the image of the object formed by the picture-taking lens group (first to third lenses 121 to 123);

an optical member 130 (fourth lens 124 and low-pass filter 125) arranged along an optical axis 012 of the picture-taking lens group (first to third lenses 121 to 123) and ahead of a light-receiving surface of the image pickup device 126;

a zoom actuator (zoom motor) 180 to drive a zoom lens group (second lens 122) of the picture-taking lens group (first to third lenses 121 to 123); and a focus actuator (AF motor 140) to drive a focus lens group (third lens 123) of the picture-taking lens group (first to third lenses 121 to 123), wherein a space which houses the focus actuator (AF motor 140) is formed between an inner surface of the lens barrel 120 and one outer surface of the optical member 130 (fourth lens 124 and low-pass filter 125).

[40] In the picture-taking lens unit 100 according to the embodiment, described in above paragraph [39], the zoom actuator (zoom motor) 180 and the focus actuator (AF motor) 140 are located in a first region E1 having a boundary corresponding to a plane including the first and second optical axes 011 and 012, and at least one lens of the picture-taking lens group (first to third lenses 121 to 123) is located between the zoom actuator (zoom motor) 180 and the focus actuator (AF motor) 140.

In the picture-taking lens unit 100 described above, the zoom actuator (zoom motor) 180 and the focus actuator (AF motor) 140 are properly arranged in the lens barrel 120. The space in the lens barrel 120 can thus be used effectively.

[41] In the picture-taking lens unit 100 according to the embodiment, described in above paragraph [40], the zoom actuator (zoom motor) 180 is located outside the front of the lens barrel 120 and close to the reflecting member (prism 112, etc.) within the first region E1.

The foregoing picture-taking lens unit 100 can be decreased in the length in the direction of the second optical axis 012 and thus downsized.

[42] An electronic camera according to the embodiment, comprises the picture-taking lens unit 100 described in one of above paragraphs [33] to [41].

(Modifications)

The camera according to the embodiment includes the following modifications:

The camera includes a cam section whose cam surface is formed along one edge of a cam lever.

The camera includes a guide section formed of a guide slit.

The camera employs a mirror as a reflecting member of a bending optical system.

What is claimed is:

1. A picture-taking lens unit comprising:

a lens barrel having a light-incident end;

a picture-taking lens group which is provided so as to form an image of an object based on light incident from the light-incident end of the lens barrel;

an image pickup device provided in the lens barrel to photoelectrically convert the image of the object formed by the picture-taking lens group;

an optical member arranged along an optical axis of the picture-taking lens group and ahead of a light-receiving surface of the image pickup device;

a lens holding frame which holds a specific lens of the picture-taking lens group, the lens holding frame being provided movably along the optical axis the picture-taking lens group;

an actuator mounted on the lens holding frame, which controls a movement of the lens holding frame; and a band-shaped flexible printed board which is bent in a thickness direction and provided to supply power to a driving system including the actuator, and wherein a first space which houses the actuator is formed between an inner surface of the lens barrel and one outer surface of the optical member, and a second space which houses a portion curved by bending the flexible printed board is formed between the inner surface of the lens barrel and the other outer surface of the optical member.

2. The picture-taking lens unit according to claim 1, further comprising a picture-taking optical system including a bending optical system which reflects light incident from the object along a first optical axis in a direction of a second optical axis, which is substantially perpendicular to the first optical axis, by a reflecting member, and wherein the picture-taking lens group, the optical member, and the image pickup device are arranged along the second optical axis.

3. The picture-taking lens unit according to claim 1, further comprising a picture-taking optical system including a bending optical system which reflects light incident from the object along a first optical axis into a direction of a second optical axis, which is substantially perpendicular to the first optical axis, by a reflecting member, and wherein the picture-taking lens group, the optical member, and the image pickup device are arranged along the second optical axis, and the first space and the second space are formed in a first region and a second region, respectively when a plane including the first and second optical axes and is considered to be a boundary between the first and second regions.

4. The picture-taking lens unit according to claim 1, wherein the flexible printed board includes a plurality of flexible printed boards, and the printed boards are bent in a same direction at substantially same portions thereof to form curved portions, the curved portions overlapping with each other in the second space.

5. The picture-taking lens unit according to claim 1, wherein one end portion of the flexible printed board is fixed in a given position of the lens holding frame, and a limiting member is provided to limit a range within which the curved portions of the flexible printed board vary with a movement of the lens holding frame.

6. The picture-taking lens unit according to claim 4, wherein one end portion of the flexible printed board is fixed in a given position of the lens holding frame, and a limiting member is provided to limit a range within which the curved portions of the flexible printed board vary with a movement of the lens holding frame.

7. An electronic camera comprising the picture taking lens unit according to claim 1.

* * * * *